(12) United States Patent
Karpov et al.

(10) Patent No.: US 10,987,583 B2
(45) Date of Patent: *Apr. 27, 2021

(54) METHOD AND APPARATUS FACILITATING REALISTIC PLAYER INTERACTION IN A SIMULATED SKILL GAME

(71) Applicant: Everi Games, Inc., Austin, TX (US)

(72) Inventors: Evgeny Karpov, Chicago, IL (US); Juan Mariscal, Chicago, IL (US)

(73) Assignee: Everi Games, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,393

(22) Filed: Oct. 28, 2019

(65) Prior Publication Data

US 2020/0061466 A1    Feb. 27, 2020

Related U.S. Application Data

(63) Continuation of application No. 15/716,474, filed on Sep. 26, 2017, now Pat. No. 10,456,683.

(51) Int. Cl.
*A63F 13/52*    (2014.01)
*A63F 13/80*    (2014.01)
*A63F 13/25*    (2014.01)

(52) U.S. Cl.
CPC .............. *A63F 13/52* (2014.09); *A63F 13/25* (2014.09); *A63F 13/80* (2014.09)

(58) Field of Classification Search
None
See application file for complete search history.

(56) References Cited

U.S. PATENT DOCUMENTS

| | | | |
|---|---|---|---|
| 7,753,777 | B1 | 7/2010 | Giuffria |
| 8,231,453 | B2 | 7/2012 | Wolf |
| 8,858,321 | B2 | 10/2014 | Popovich |
| 10,204,488 | B2 | 2/2019 | Thirumaleshwar |
| 2010/0009742 | A1 | 1/2010 | Popovich |
| 2015/0154834 | A1 | 6/2015 | Grace |
| 2016/0093163 | A1 | 3/2016 | Osawa |
| 2016/0093173 | A1 | 3/2016 | Osawa |

*Primary Examiner* — Seng H Lim
(74) *Attorney, Agent, or Firm* — The Culbertson Group, P.C.; Russell D. Culbertson

(57) ABSTRACT

A method of controlling prize targets displayed during a play in a target-interactive game includes receiving a total prize amount to be awarded for the play of the game and determining an expected target value for a respective record from a target sequence comprising a sequence of records. The method further includes selecting a target value for the respective record from a number of different available target values, where the selected target value comprises a value from among the number of different available target values that bears a predefined relationship to the expected target value. Once the target value is selected, the method includes selecting a target type correlated to the selected target value and then causing a prize target corresponding to the selected target type to be launched in the game.

20 Claims, 11 Drawing Sheets

METHOD AND APPARATUS FACILITATING REALISTIC PLAYER INTERACTION IN A SIMULATED SKILL GAME

COPYRIGHT NOTICE

A portion of the disclosure of this patent document contains material which is subject to copyright protection. The copyright owner has no objection to the facsimile reproduction of the patent document or the patent disclosure, as it appears in the U.S. Patent and Trademark Office records, but otherwise reserves all rights of copyright whatsoever.

CROSS-REFERENCE TO RELATED APPLICATION

This application claims the benefit, under 35 U.S.C. § 120 and § 121, of U.S. patent application Ser. No. 15/716,474 filed Sep. 13, 2017 and entitled "Method and Apparatus for Facilitating Realistic Player Interaction in a Simulated Skill Game," now U.S. Pat. No. 10,456,683. The entire content of this prior patent application is incorporated herein by this reference.

TECHNICAL FIELD OF THE INVENTION

The invention relates to gaming systems and methods which provide simulated skill games. More particularly, invention relates to gaming systems and methods which provide improved realism in simulated skill games in which players interact with targets displayed over the course of the game.

BACKGROUND OF THE INVENTION

Modern gaming systems provide a wide variety of games in an effort to capture and maintain players' interest and thereby encourage play. In addition to attractive and exciting graphics, games may offer bonus games in addition to a primary game available at a gaming machine. In the case of bonus games, play typically begins in a primary game and then moves to one or more levels of bonus games in response to some trigger in the course of play. Both primary and bonus games may provide some level of player interaction in addition to simply placing a wager and initiating play in the game. Some gaming machines provide simulated skill games in which the prize for a given play is predetermined and not truly determined by the player interaction. These simulated skill games present the problem of making the interaction seem realistic even though the prize is predetermined and not ultimately based on the player's inputs in the game.

SUMMARY OF THE INVENTION

The various aspects of the present invention apply to player-interactive games in which a player's interaction appears to determine the outcome of a play of the game while in fact the overall prize to be awarded for the play is predetermined. In particular, aspects of the invention apply to games in which one or more prize targets are displayed on a display system of a gaming machine, and the player may make an input to interact with each prize target. Each prize target is associated with a predetermined value and a result of the play is a prize value that, while predetermined, includes the respective predetermined value of each prize target receiving a successful interaction from the player in the course of the play in the game. These types of player-interactive games may be referenced in this disclosure as "target-interactive" games.

Aspects of the invention will be described below particularly in connection with a target-interactive game in which various targets including prize targets are shown on a display device (or multiple display devices) of a gaming machine and the player may interact with a given target by swiping across the image target on the display. The swipe may be directly on the screen where the targets are displayed on touch sensitive displays, or indirectly such as by control of a cursor. In this example a successful interaction is a swipe over the area of the target on the display screen. It will be appreciated, however, that the invention is not limited to any particular type of interaction with a displayed target. Aspects of the invention may also be applied to implementations in which the interaction is a simulated firing of an object or beam at a target, and a successful interaction is one in which the simulated object or beam hits the area of a target as it appears on the display screen.

It is an object of the invention to control the launch of prize targets, that is, the display of prize targets on the display or displays (display system), to ensure that each of the player's successful interactions with a prize target contributes to the overall accumulated prize in a natural fashion while the overall prize for the play of the game remains constrained to the value that has been predetermined for the play in the player-interactive game. A play in the player-interactive game may be referenced herein simply as a "play."

According to one aspect of the present invention, a method of controlling prize targets displayed during a play in a target-interactive game includes receiving a total prize amount to be awarded for the play of the player-interactive game and determining an expected target value for a respective record from a target sequence comprising a sequence of records. A method according to this aspect of the invention further includes selecting a target value for the respective record. This target value is selected from a number of different available target values and comprises a value from among the number of different available target values that bears a predefined relationship to the expected target value. Once the target value is selected, the method includes selecting a target type correlated to the selected target value and then causing a prize target corresponding to the selected target type to be launched in the game, that is, displayed on the display system so that the player may interact with the prize target. These steps of determining the expected target value, selecting a target value, selecting a corresponding target type, and then causing the prize target to be displayed on the display system are repeated for each respective record in the target sequence until an end condition is detected for the play.

Some implementations according to this first aspect of the invention have the capability of launching prize targets in very rapid succession or essentially at the same time on the display system. Any such quantity of prize targets launched in rapid succession or essentially at the same time may be constrained according to target type or target value. For example, prize targets launched in rapid succession may be constrained to the same target type, or may be constrained to a randomly selected target type. In these implementations, a number of adjacent records in the sequence of records (the number comprising the number of targets launched in rapid succession or at the same time) may be linked by a wave type property which specifies the desired constraints or properties of each such linked record and thus defines a relationship between each such linked record.

Methods according to this first aspect of the invention leave the selection of a target value to immediately before, or essentially at, the time that the next prize target in the game is to be launched/displayed. The selection of target value based on a predefined relationship to an expected target value essentially at the time the prize target is to be launched/displayed, takes into account the previous interactions from the player in the course of play and helps result in a simulated random launching/display of targets while reducing the risk that player interactions will result in an overall prize value from interactions that either exceeds the prize value that has been predetermined for that play of the game or is very low compared to the predetermined prize value.

Methods according to this first aspect of the invention may further include generating the target sequence. Each record of the target sequence correlates to an unspecified respective target to be displayed in the play and specifies a delay from a time that a previous target is displayed on the display system. However, at the time the target sequence is generated, the various records included in the sequence are preferably not correlated to any type of target or target value. Rather, as described above, the target values and the targets themselves are selected in the course of play of the game.

Some implementations of the invention may include different modes of play in the course of the game. Additional game modes may be invoked during the course of play to change various play characteristics. For example, an additional mode of play may introduce targets at a higher or lower rate, in a different pattern, and/or from different locations of the display. An additional game mode may also change a speed at which targets move across a display area, either slowing the speed down or increasing the speed, or perhaps varying the speed for different targets in the sequence. It is also possible that an additional game mode may apply a multiplier to the predefined value of the various targets. These implementations including multiple game modes may specify a game mode modifier for the play of the game, which may be a particular type of target, a game mode modifier target, for example. Continuing with this example, a successful interaction with a game mode modifier target may cause the game mode to switch from an original or main game mode to an additional game mode. In any event, implementations including an additional game mode (that is, mode of play in the game) may include also generating an additional target sequence comprising a sequence of records for the additional mode of play. When the play of the game is in an additional game mode, the steps of determining an expected target value, selecting a target value, selecting a target, and causing the prize target to be displayed are all performed similarly as to the method described above, but in relation to a respective record in the additional target sequence which is made the active sequence at that point in the play. In the case of the additional game mode, the process of determining an expected target value, selecting a target value, selecting a target, and causing the prize target to be displayed are all performed for each record in the additional target sequence until an end condition is detected for the additional game mode. This end condition may be a time limit for example, and the play may then switch back to a main play mode and its associated target sequence as the active sequence.

Implementations including multiple modes of play in the game may include selecting a prize distribution between the different game modes so that more or less of the total prize predetermined for the play of the game will be awarded for a given mode. In particular, an additional mode may increase the number of targets and/or include a target multiplier for successful interactions, and it may be desirable to have more of the predetermined prize to be awarded from interactions in this additional mode than in a main mode.

Determining the expected target value for each target to be displayed in the course of a play according to aspects of the invention may include determining an available prize and a remaining target count. The available prize may be taken as an amount by which the total prize amount to be awarded exceeds a combined value of all prize targets having previously received a respective successful interaction from the player in the play in the game and the value of all prize targets currently displayed on the display system. The remaining target count comprises at least an estimate of the remaining prize targets to be displayed in the play in the game.

As noted above, a target value is selected for a respective record in the active sequence of records based on a predefined relationship to the expected target value that has been determined for that record. The predefined relationship may be any suitable relationship. In some implementations the predefined relationship may comprise the minimum differential to the expected target value, that is, the available target value that is closest to the expected target value which has been determined. Other implementations may introduce an additional randomness to the target value selection by randomly selecting an available target value from within a predefined distribution about the expected target value determined for that record.

Another aspect of the present invention includes a gaming machine that provides a target-interactive game. A gaming machine according to this aspect of the invention includes a display system operable for displaying the prize targets in the course of the game, and a player input system operable to enable a player to interact with the displayed prize targets. A gaming machine according to this aspect of the invention also includes at least one processor and at least one memory device storing instructions executable by the processor to perform operations corresponding to the method steps of the above-described methods. All of the above described variations in methods implementing aspects of the invention also apply to this gaming machine aspect of the invention.

Because methods and gaming machines according to the present invention may be implemented with processing devices operating under the control of program code, another aspect of the present invention includes a program product comprising one or more non-transitory computer readable data storage devices storing program code. The program code is executable by a processor such as a gaming machine processor to perform the operations described above in connection with methods according to the invention. The program code may include player input program code, expected target value program code, and target launching program code. The player input program code is executable to respond to each successful interaction input from a player for a given prize target to add the predetermined value of the prize target to an accumulator. The expected target value program code may be executable to determine the expected target value for each record in a sequence, while the target launching program code may be executable to select a target value for a given record, select a target type, and cause the corresponding prize target to be displayed as described above. Sequence generating program code may also be included in some implementations to generate the target sequences.

These and other advantages and features of the invention will be apparent from the following description of representative embodiments, considered along with the accompanying drawings.

DESCRIPTION OF REPRESENTATIVE EMBODIMENTS

Figure 1:
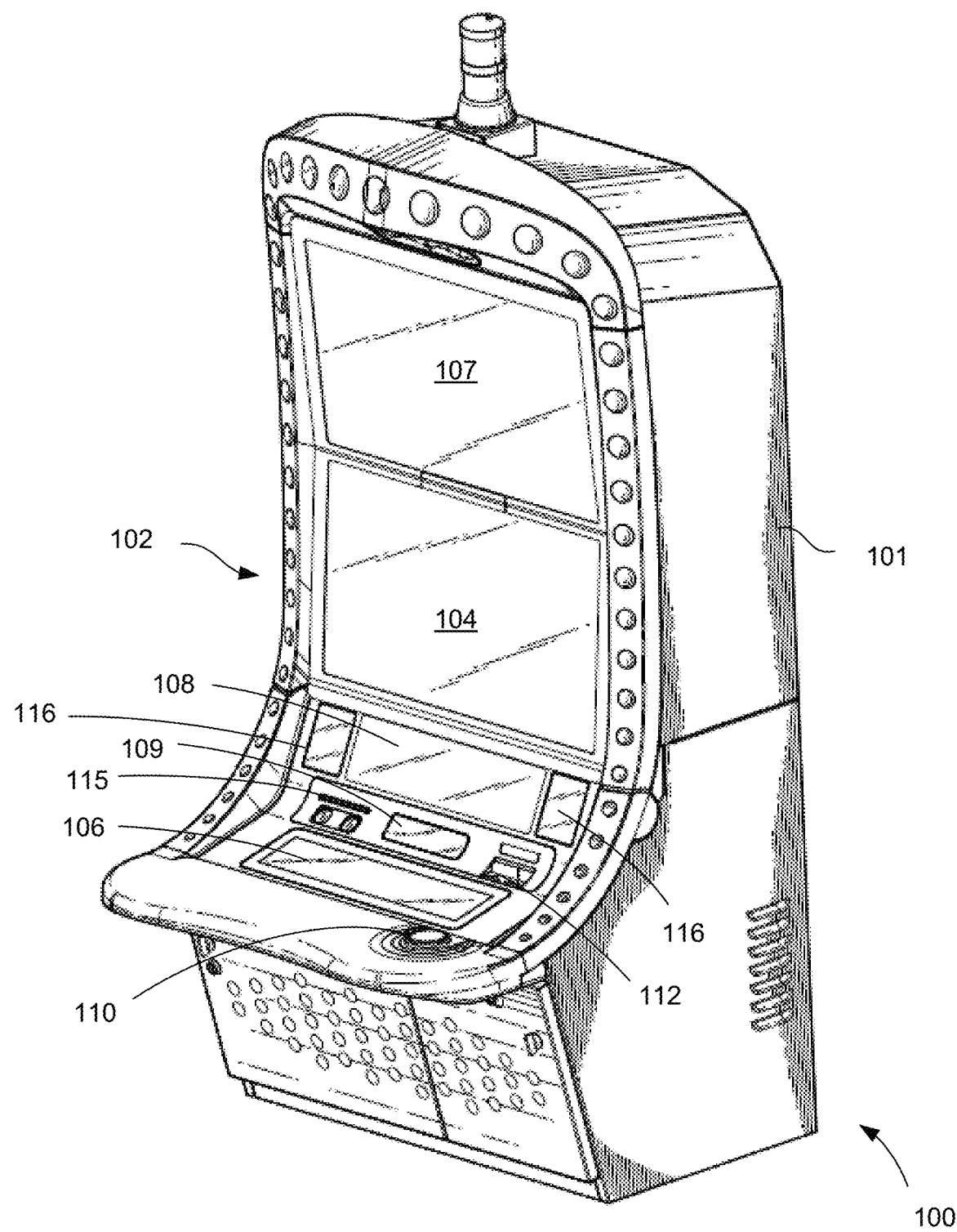
FIG. 1 is a perspective view of a gaming machine that may be used for a target-interactive game in accordance with implementations of the present invention.
Figure 2:
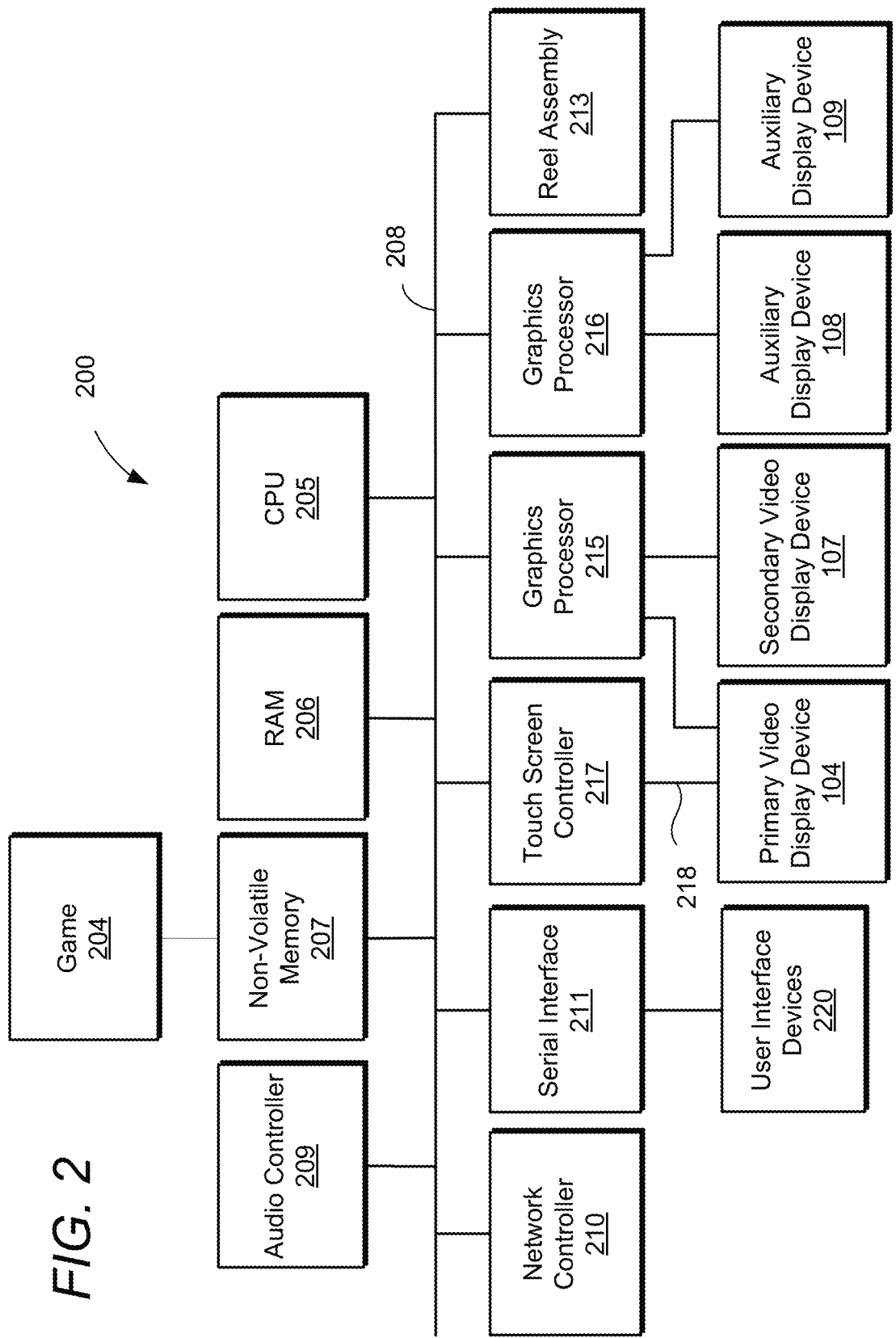
FIG. 2 is a block diagram showing the various components that may be included in the gaming machine shown in FIG. 1.
Figure 3:
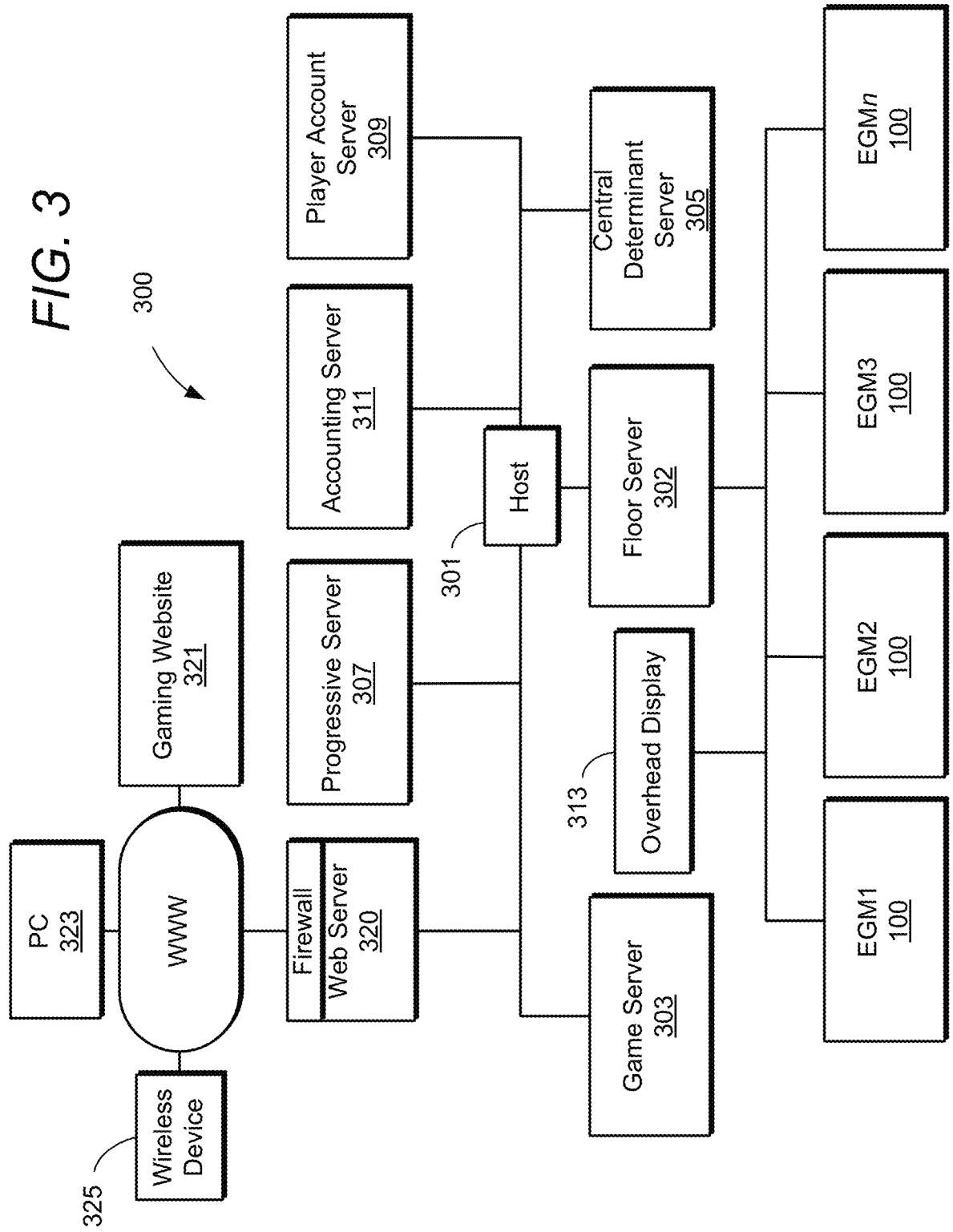
FIG. 3 is a block diagram of a gaming system including gaming machines such as that shown in FIG. 1.
Figure 4:
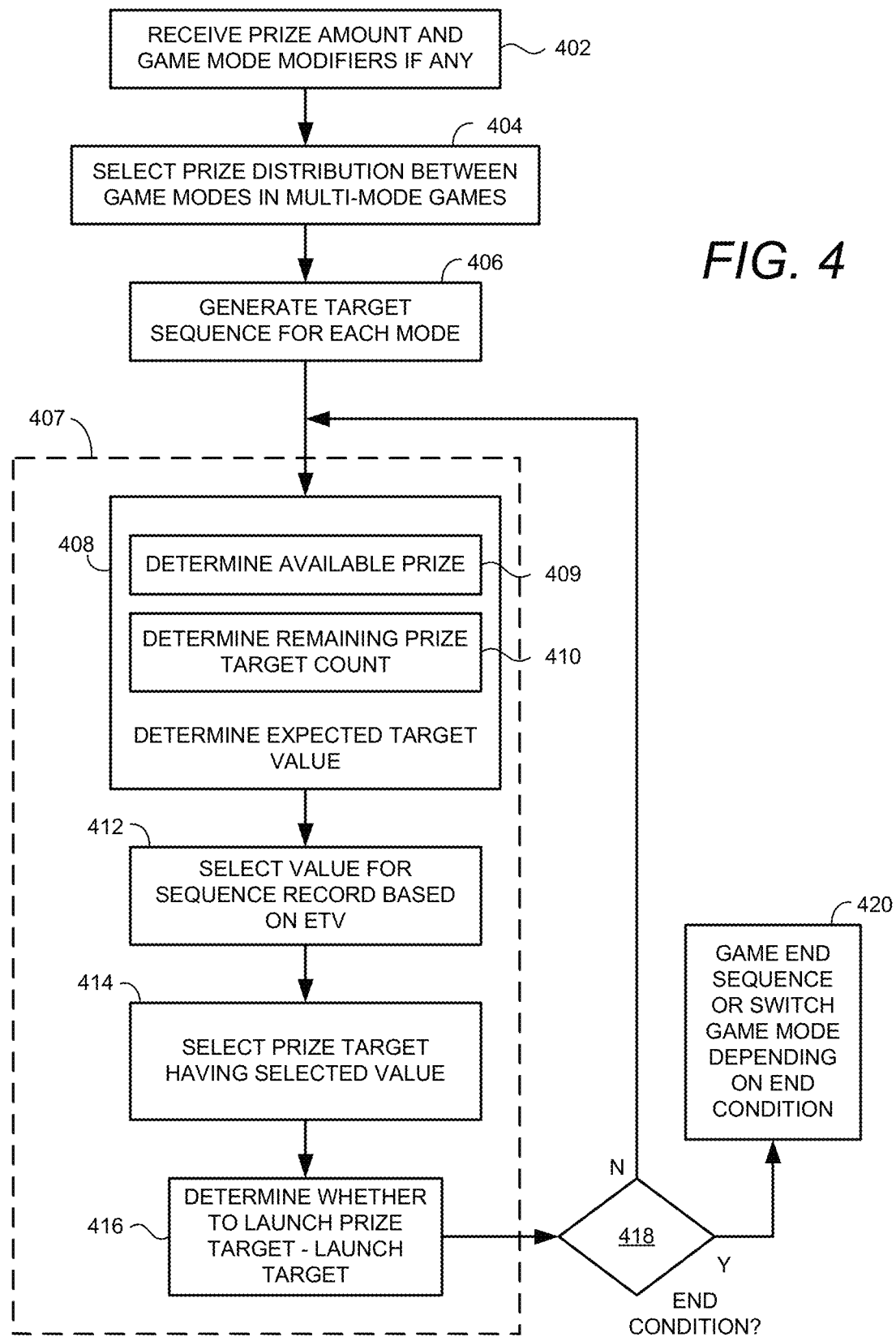
FIG. 4 is a process flow diagram showing an example process according to an aspect of the present invention.

FIGS. 1-3 will be used to describe gaming machines and gaming networks in which aspects of the present invention may be implemented. FIG. 4 will be used to describe example methods of defining prize targets in a target-interactive game according to various implementations of the present invention, while FIGS. 5 and 6 will be used to describe processes of player interactions in the course of a target-interactive game. FIGS. 7-12 will be referenced below to describe an implementation of a target-interactive game employing a target control system according to the invention.

Referring to FIG. 1, gaming machine 100 includes a cabinet 101 having a front side generally shown at reference numeral 102. A primary video display device 104 is mounted in a central portion of the front side 102, and a touch-screen button panel 106 is positioned below the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future. One or more of these video display devices, and especially primary video display device 104, may be used to display graphics associated with a target-interactive game in accordance with aspects of the present invention. As will be described further below in connection with FIG. 2 and elsewhere, it is also possible for gaming machines within the scope of the present invention to include mechanical elements such as mechanical reels. Generally, the display device or display devices of the gaming machine, through which a target-interactive game may be presented may be described in this disclosure and the accompanying claims as a "display system."

The gaming machine 100 illustrated for purposes of example in FIG. 1 also includes a mechanical control button 110 mounted adjacent to touch-screen button panel 106. This control button 110 may allow a player to make a play input to start a play in a wagering game conducted through gaming machine 100, while virtual buttons included (but not shown in this view) on button panel 106 or other physical buttons or controls may allow a player to select a bet level for a game implemented at the gaming machine and select a type of game or game feature. Touch-screen button panel 106 may also be used in implementations of target-interactive games to allow the player to control a cursor that may be displayed on another display such as display 104 or 107, for example. Other forms of gaming machines through which the invention may be implemented may include switches, joysticks, or other mechanical input devices, in addition to the virtual buttons and other controls implemented on touch-screen button panel 106. For example, primary video display device 104 in gaming machine 100 provides a convenient display device for implementing touch screen controls in addition to or in lieu of controls included on touch-screen button panel 106 or mechanical controls. The player interface devices which receive player inputs in the course of a game played through the gaming machine, such as controls to select a wager amount for a given play, controls to enter a play input to actually start a given play in the wagering game, or controls to allow a player to make other player inputs in a game according to the present invention, may be referred to generally as a "player input system."

It will be appreciated that gaming machines may also include a number of other player interface devices in addition to devices that are considered player controls for use in entering inputs in the course of a particular game. Gaming machine 100 also includes a currency/voucher acceptor having an input ramp 112, a voucher/receipt printer having a voucher/receipt output 115, and a player card reader (not shown in the view of FIG. 1). Numerous other types of player interface devices may be included in gaming machines that may be used to implement embodiments of the present invention.

Gaming machine 100 may also include a sound system to provide an audio output to enhance the user's playing experience. For example, illustrated gaming machine 100 includes speakers 116 which may be driven by a suitable audio amplifier (not shown) to provide a desired audio output at the gaming machine.

FIG. 2 shows a logical and hardware block diagram 200 of gaming machine 100 which includes a processor (CPU) 205 along with random access memory (RAM) 206 and nonvolatile memory or storage device 207. All of these devices are connected on a system bus 208 with an audio controller device 209, a network controller 210, and a serial interface 211. A graphics processor 215 is also connected on bus 208 and is connected to drive primary video display device 104 and secondary video display device 107 (both mounted on cabinet 101 as shown in FIG. 1). A second graphics processor 216 is also connected on bus 208 in this example to drive the auxiliary display devices 208 and 209 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104 or touch-screen button panel 106 or both. It will be appreciated that the touch screen element itself typically comprises a thin film that is secured over the display surface of the respective display device such as the display device of touch-screen button panel 106 in FIG. 1. The touch screen element itself is not illustrated or referenced separately in the FIGS.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements may be mounted on (or connected to) a standard personal computer motherboard and housed in a standard personal computer housing which itself may be mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller for example. It will also be appreciated that some of the devices shown in FIG. 2 as being connected directly on system bus 208 may in fact communicate with the other system components through a suitable expansion bus. Audio controller 209, for example, may be connected to the system via a PCI or PCIe bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention. For example, a gaming machine in some embodiments of the present invention may rely on one or more data processors which are located remotely from the gaming machine itself. Embodiments of the present invention may include no processor such as CPU 205 or graphics processors such as 215 and 216 at the gaming machine, and may instead rely on one or more remote processors. Thus unless specifically stated otherwise, the designation "gaming machine" is used in this disclosure and the accompanying claims to designate a system of devices which operate together to provide the indicated functions. A "gaming machine" may include a gaming machine such as gaming machine 100 shown in FIGS. 1 and 2, which is itself a system of various components, and may also include one or more components remote from a gaming machine cabinet (that is, cabinet 101 in FIG. 1). Thus the designation "gaming machine" encompasses both a stand-alone gaming machine and a gaming machine (that is, the part housed in a cabinet such as cabinet 101 in FIG. 1) along with one or more remote components for providing various functions (such as generating prize amounts for target-interactive games, generating target sequences and performing other operations described below in the examples of FIGS. 4-6.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 208 and 209, CPU 205 or a graphics processor packaged with or included with CPU 205 may control all of the display devices directly without any separately packaged graphics processor. The invention is not limited to any particular arrangement of processing devices for controlling the video display devices included with gaming machine 100. Also, a gaming machine implementing the present invention is not limited to any particular number of video display devices or other types of display devices.

In the illustrated gaming machine 100, CPU 205 executes software, that is, program code, which ultimately controls the entire gaming machine including the receipt of player inputs and the presentation of the graphics or information displayed according to the invention through the display devices 104, 107, 108, and 109 associated with the gaming machine. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for game software, including target-interactive game software (program code) prior to loading into random access memory 206 for execution, or for programs not in use or for other data generated or used in the course of gaming machine operation. Network controller 210 provides an interface to other components of a gaming system in which gaming machine 100 may be included. An example network will be described below in connection with FIG. 3.

It should be noted that the invention is not limited to gaming machines employing the personal computer-type arrangement of processing devices and interfaces shown in example gaming machine 100. Other gaming machines through which the invention may be implemented may include one or more special purpose processing devices to perform the various processing steps for implementing the invention. Unlike general purpose processing devices such as CPU 205, which may comprise an Intel Pentium® or Core® processor for example, these special purpose processing devices may not employ operational program code to direct the various processing steps.

The example gaming machine 100 is shown in FIG. 2 as including user interface devices 220 (part of a player input system) connected to serial interface 211. These user interface devices may include various player input devices such as mechanical buttons shown on touch-screen button panel 106 in FIG. 1, and/or levers, and other devices. It will be appreciated that the interface between CPU 205 and other player input devices such as player card readers, voucher readers or printers, and other devices may be in the form of serial communications. Thus serial interface 211 may be used for those additional devices as well, or the gaming machine may include one or more additional serial interface controllers. However, the interface between peripheral devices in the gaming machine, such as player input devices, is not limited to any particular type or standard for purposes of the present invention.

Reel Assembly 213 is shown in the diagrammatic representation of FIG. 2 to illustrate that a gaming machine which may present target-interactive games may also include mechanical reels. For example, a number of sets of mechanical reels may replace the primary display device 104, or at least part of that display device. Alternatively, mechanical reels may be included in the gaming machine behind a light-transmissive video display panel. In either case, the mechanical reels represent a display device for displaying various game symbols in the course of a game play. Although the invention is not limited to any particular mechanical reel arrangement or control system, mechanical reels may be controlled conveniently through serial communications which provide instructions for a respective stepper motor for each reel. Thus some embodiments of the present invention which employ mechanical reels may use a serial interface device such as serial interface 211 to control communications with the reel assembly, and may not include a direct bus interconnection as indicated by FIG. 2. Details of a mechanical reel arrangement and various accent lighting arrangements which may be associated with mechanical reels are not shown in the present FIGS. so as to avoid obscuring the present invention in unnecessary detail.

Referring now to FIG. 3, a networked gaming system 300 associated with one or more gaming facilities may include one or more networked gaming machines 100 ("electronic gaming machines" or "EGM's") connected in the network by suitable network cable or wirelessly. Networked gaming machines 100 (EGM1-EGMn) and one or more overhead displays 313 may be operatively connected so that the overhead display or displays may mirror or replay the content of one or more displays of gaming machines 100. For example, the primary display content for a given gaming machine 100 (including a game play according to the present invention) may be transmitted through network controller 210 to a controller associated with the overhead display(s) 313. In the event gaming machines 100 have cameras installed, the respective player's video images may be displayed on overhead display 313 along with the content of the player's gaming machine display.

The example gaming network 300 shown in FIG. 3 includes a host server 301 and floor server 302, which together may function as an intermediary between floor devices such as gaming machines 100 and back office devices such as the various servers described below. Game server 303 may provide server-based games and/or game services to network connected gaming devices such as gaming machines 100. Central determinant server 305 may be included in the network to identify or select lottery, bingo, or other centrally determined game outcomes and provide the outcome information to networked gaming machines 100 which present the games to players.

Tournament server 306 may be included in the system for controlling or coordinating tournament functions. These functions may include maintaining tournament player scores and ranking in real time during the course of tournament play, and communicating this information to the various gaming machines 100 participating in the tournament. Tournament server 306 may also function to enroll players in tournaments, schedule tournaments, and maintain the time remaining in the various tournaments.

Progressive server 307 may maintain progressive pools for progressive games which may be available through the various gaming machines 100. In some implementations, progressive server 307 may simply receive communications indicating contribution amounts which have been determined by processes executing at the various gaming machines 100 or elsewhere in the gaming network. Alternatively, progressive server 307 may perform processes to determine the contribution amounts for incrementing the various progressive pools which may be maintained. Progressive server 307 may also periodically communicate current pool values back to the various gaming machines 100, and may participate in communicating awarded progressive prize amounts to the gaming machines and making adjustments to the progressive prize pools accordingly. In some implementations, progressive server 307 may also determine or participate in determining when a progressive prize triggering event occurs.

Accounting server 311 may receive gaming data from each of the networked gaming devices, perform audit functions, and provide data for analysis programs. Player account server 309 may maintain player account records, and store persistent player data such as accumulated player points and/or player preferences (for example, game personalizing selections or options).

Example gaming network 300 also includes a gaming website 321 which may be hosted through web server 320 and may be accessible by players via the Internet. One or more games may be displayed as described herein and played by a player through a personal computer 323 or handheld wireless device 325 (for example, a Blackberry® cell phone, Apple® iPhone®, personal digital assistant (PDA), iPad®, etc.). To enter website 321, a player may log in with a user name that may, for example, be associated with the player's account information stored on player account server 309. Once logged in to website 321 the player may play various games on the website, including games according to the invention. Also website 321 may allow the player to make various personalizing selections and save the information so it is available for use during the player's next gaming session at a casino establishment having the gaming machines 100.

It will be appreciated that gaming network 300 illustrated in FIG. 3 is provided merely as an example of a gaming network which may facilitate target-interactive games according to aspects of the present invention, and is not intended to be limiting in any way. Target-interactive games according to aspects of the present invention are not limited to use with gaming networks such as network 300.

FIG. 4 shows an example process of controlling the introduction of prize targets on a display system for a target-interactive game in accordance with aspects of the present invention. The illustrated method includes first receiving a prize amount for a play in the game and any game mode modifiers that may be presented in the course of play as shown at process block 402. The method further includes, at process block 404, selecting a prize distribution between game modes in the case where multiple different game modes are defined for the play. A target sequence is then generated for each mode of play that may be in effect over the course of the play as shown at process block 406. These steps shown at process blocks 402, 404, and 406, may be performed once for each instance of target-interactive game.

The process shown in FIG. 4 next includes a series of steps shown in dashed box 407 which are performed for each prize target to be displayed over the course of a play in the game. These steps include first determining an expected target value as shown at process block 408. The expected target value here is determined for a next record in an active one of the target sequences generated at process block 406. The illustrated process next includes selecting a value of the prize to be associated with that record based on the expected target value as shown at process block 412. Once the value for the record is determined, the process includes selecting a target having the selected target value as shown process block 414. An additional step may be taken as shown at process block 416 to determine whether to launch the prize target and the prize target may be then launched, that is, displayed on the display system in the event the determination is positive. The process then checks for an end condition as shown at decision box 418. If an end condition is not detected the process loops back to perform steps in dashed box 407 again for another record in the active target sequence. However, if the end condition is detected as indicated by an affirmative outcome at decision box 418, a termination process is performed as indicated at process block 420. As will be described below, this termination process may include switching back to another target sequence as the active sequence for the process on dash box 407, or performing a game ending sequence depending upon the nature of the end condition detected.

The prize amount to be awarded for a given instance of the interactive target game may be generated in any suitable process either at the particular gaming machine or externally. Regardless of how and specifically where the prize amount is determined, the present amount may be communicated in any suitable fashion so that it is available as a basic input to the process shown in FIG. 4. Similarly, a number and type of any game mode modifiers to be presented in the course of an instance of the interactive target game may be generated and communicated for use by the process in FIG. 4 in any suitable fashion. It should be appreciated that some interactive target games may not include any game mode modifiers so that the play in the game is conducted in a single mode from start to finish.

In the event game mode modifiers are designated for an instance of an interactive target game, methods according to the present invention may include selecting a prize distribution between the game modes. This prize distribution represents the amount of the predetermined prize to be awarded in the various game modes that may be entered in the play of the target-interactive game. While a prize distribution between various game modes and these multi-mode games may be consistent from one game to the next and thus no selection performed, the selection indicated at process block 404 may be used to provide more variety between instances of the game and produce an enhanced sense of realism. Where a prize distribution is selected between game modes, the selection at process block 404 may be in any suitable fashion to produce the desired distribution between game modes.

Generating a target sequence for each mode as shown at process block 406 in FIG. 4 includes producing a series or sequence of target records for each mode that may become active in the course of the play. Each target record in a respective generated sequence is not associated with any particular target from the different targets available in the game at this point in the process. Rather, each record provides a placeholder for the assignment of a particular target in accordance with the process steps shown particularly at dashed box 407 in FIG. 4 in the course of play. In some implementations each record of a target sequence may specify a time delay from the launch of the immediately preceding target. However, the timing between the launch of targets may be specified outside of the target sequences. In any event, the process includes generating a separate target sequence for each mode that may be in effect over the course of the play in the game. In particular, a separate sequence is generated for a main mode that may be in effect at the start of the play, and a separate target sequence is generated for each different mode that may be in effect. The number of records in each sequence will be sufficient to ensure that a record is available for each corresponding prize target to be displayed for that game mode.

In some implementations of the present invention, a number of individual adjacent records in a target sequence may be linked to form a wave of records in the target sequence. This linking of records helps facilitate the launch of several targets simultaneously or in rapid succession in the course of a play in the target-interactive game. Waves of records may be defined as having certain properties such as delay from a previous wave and wave type. A wave type property may be used to define constraints on launched target types within the wave. These constraints could, for example, define that the target type is selected independently of each other target type for records in the wave. Alternatively, a wave type constraint could require that each target in the wave is constrained to the same target type. In cases where individual records from a target sequence are linked into a wave, the process shown in FIG. 4 may be modified so that all of the individual records in the wave are processed to select a prize target for the respective record prior to launching any of the prize targets selected in the wave.

The expected target value determined at process block 408 in FIG. 4 is defined for the illustrated process as an "Available Prize" divided by a "Remaining Target Count." Thus the process of determining the expected target value shown in FIG. 4 includes the steps of determining the Available Prize at process block 409 and also determining the Remaining Target Count at that point in the play as shown at process block 410. All the steps associated with process block 408 are performed for the state of the game for the next prize target to be launched. The Available Prize determined at process block 409 comprises the value defined by the total prize received at process block 402 less any collected prize, that is, prizes accumulated by successful interactions with prize targets thus far over the course of the play (Collected Prize), and also less the value of each target currently displayed for player interaction (In-Flight Prize). Values for Collected Prize and In-Flight prize may be maintained over the process shown in FIG. 4 in any suitable manner. In particular, the Collected Prize may be maintained by an accumulator that simply accumulates the value of each target which has received a successful player interaction over the course of the play in the game. The In-Flight Prize value may also be maintained by a separate accumulator that adds a target value each time a target is introduced onto the display and subtracts the target value each time the target is removed either by naturally leaving the display or in response to receiving a successful player interaction. The remaining target count may be determined easily in single mode games since the sequence generated at process block 406 together potentially with the time remaining in the play of the game determines the number of targets that will be introduced onto the display after the given point in time. However, implementations according to the present invention may include modes that are conditional in the sense that they are only invoked in response to some player interaction over the course of the game. For example, an additional game mode may be invoked when a player successfully interacts with a game mode modifier target displayed in the display area. In these cases where a game mode is conditional and may affect the remaining target count because the mode introduces more or fewer prize targets as compared to other modes, the remaining target count preferably includes determining a maximum remaining target count for performing the expected target value determination indicated at process block 408.

Once the expected target value is determined for the next record in the active target sequence, the process of selecting a target value for that record may simply include selecting a value from an available target value list that is closest to the determined expected target value. For example, four different target values may be defined for the game, comprising 1, 5, 10, and 20. In the case where the expected target value is determined to be 6.7 for a given determination as shown at process block 408, the nearest value 5 may be selected in accordance with the process at block 412. Alternatively, an additional randomization may be added to the target value selection process at block 412. For example, each value selection may be from a distribution or range of values about the expected target value.

It should be noted here that methods according to the present invention essentially automatically adjust the prize target launching process to the player's performance. If the player is only successfully interacting with the prize targets at a relatively low rate, the Available Prize value will remain constant or will decrease slowly while the Remaining Target Count will monotonically decrease over time. Thus the expected target value (Available Prize (Remaining Target Count) will increase in these circumstances resulting in relatively higher values being selected in the step at process block 412 in FIG. 4. Vice versa, if the player outperforms the average, the Available Prize will decrease rapidly and the expected target value will also reduce quickly to values at which relatively lower values are selected in accordance with the step at block 412 in FIG. 4.

The process of selecting a particular target type as shown at process block 414 and FIG. 4 may include selecting a target type from a number of available target types at a given target value. For example, several different targets may each be defined as having a value X. Where the target value X is determined at process block 412, selecting a target type may include randomly selecting or selecting a suitable fashion one of the specific target types defined as having that value X.

The process shown in FIG. 4 may include performing safeguards to ensure that the prizes accumulated by successful player interactions over the course of the play does not exceed the predetermined prize value received for the play at process block 402. Any suitable safeguard process may be employed to provide this assurance. One such safeguard which may be performed as indicated at process block 416 is applicable where target values of "1" are available for targets to be launched in the play of the game. In this condition, the safeguard includes determining if the Available Prize is in fact greater than or equal to the Remaining Target Count. If these are equal, the process may force the prize target to be launched to be selected from the "1" value category rather than a target selected in accordance with the step at process block 414. If the Available Prize at that point in time is not greater than or equal to the Remaining Target Count the process may not launch the next target.

The end condition to be detected as indicated at decision box 418 may be any suitable end condition for the particular target sequence active for that instance of the process set out in dashed box 407. For example, an overall play whether in a single mode or multiple modes may be defined as having a given duration. In this case the inquiry at decision box 418 is whether that duration has been exceeded. Alternatively, the duration of the play may be defined by a certain number prize targets launched over the course of the play. In this case the inquiry would be a comparison of the predefined number prize targets with the number of prize targets that have been launched over the course of the play. In any event, if the end condition is not detected the process loops back to perform the steps shown in dashed box 407 to determine the next prize target to be launched for the play.

It will be noted that the process steps shown in dashed box 407 in FIG. 4 are applied to a given game mode in effect at that point in time in the target-interactive game. In the case where the mode is an additional mode of limited duration that may be entered in the course of the play, the end condition checked at decision box 418 is not the end condition for the play but rather the end condition for that mode. This again may be defined in terms of duration or in terms of a number of prize targets launched over the course of the given additional mode.

In the event the end condition is an end condition for the play of the target-interactive game, the termination sequence indicated at process block 420 may include typically a tally of the prize to be awarded for the play. Although as noted above the prize amount is predetermined, the tally process may show the amount of the prize attributed to the player's successful interactions with the prize targets. Since the prize amount for the play received at process block 402 may exceed the total prize attributed to successful interactions with the prize targets over the course of the play, the termination sequence at process block 420 may also include displaying an additional prize amount representing the difference between the total prize to be awarded (received at process block 402) and the total prize indicated by successful player interactions with the prize targets. This additional prize amount may be shown as a mystery award or in any suitable fashion to consistent with the simulated skill characteristics of the game. An example of a termination process will be described below in connection with FIGS. 11 and 12.

Wherein the end condition indicated at process block 418 is an end condition for a mode and not the play itself, the termination at process block 420 simply terminates that additional game mode sequence as the active sequence for the play and switches back to a main target sequence for the next instance of the processes shown in dashed box 407.

Figure 6:
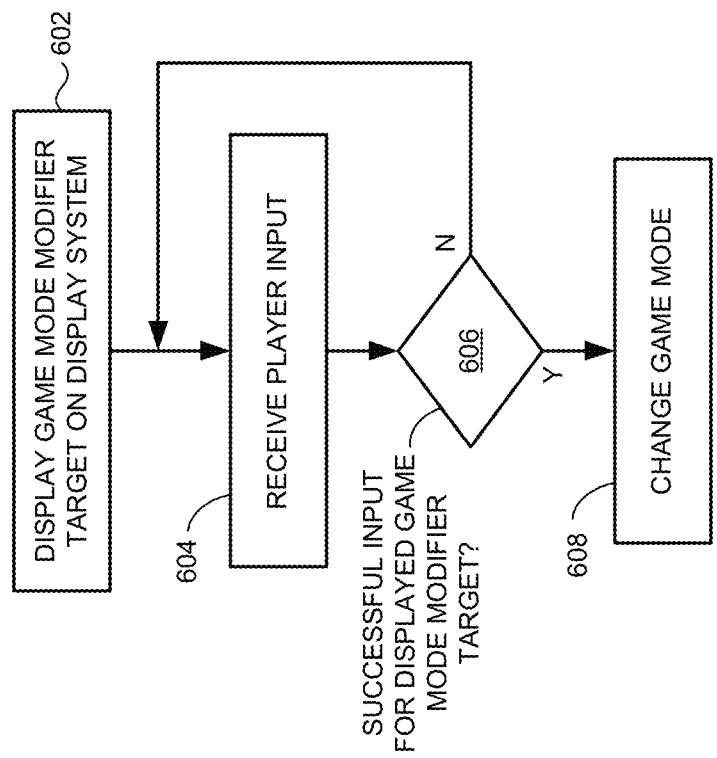
FIG. 6 is a process flow diagram showing an example process of interaction associated with a game mode modifier target displayed in the play of a target-interactive game according to aspects of the present invention.
Figure 5:
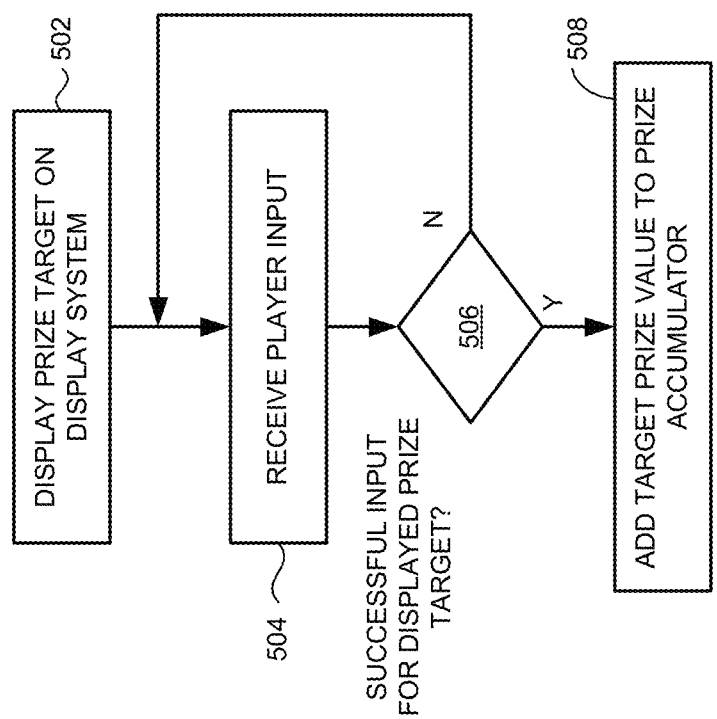
FIG. 5 is a process flow diagram showing an example process of interaction associated with each prize target displayed in the play of a target-interactive game according to aspects of the present invention.

FIGS. 5 and 6 may be used to describe player interactions with the targets in the course of play in a target-interactive game according to aspects of the present invention. Referring to FIG. 5, once a prize target is displayed or launched on a display device as indicated at process block 502, the player may make an input to interact with the prize target as indicated at process block 504. In the event the input is successful as to the target, as indicated by an affirmative outcome at process block 506, the process includes adding the prize value associated with the prize target to a prize accumulator for that play of the game. If the input received at process block 504 is not successful as to that target, the process loops back to receive the next player input.

FIG. 6 shows a process of interaction with a game mode modifier target displayed on the display system in the course of a target-interactive game. This process is applicable to implementations of the game in which a game mode modifier target is displayed on the display device and a successful interaction with the target causes the game play mode to change responsive to the successful input. As shown in FIG. 6, the method includes displaying the game mode modifier target on the display system as shown at process block 602. Once the game mode modifier target is displayed, the player may make an input with respect to the target as indicated at process block 604. If the player input is successful as to the game mode modifier target, the process proceeds from decision box 606 to change the game mode as shown at process block 608. Otherwise, if the input is not successful as to the displayed game mode modifier target, the process loops back to receive the next player input without affecting the game play mode currently in an active state.

The process of changing the game mode as indicated at process block 608 involves switching the target sequence which is active for the next prize target to be launched in the system. Referring to FIG. 4, a change in game mode is implemented by switching to the indicated additional target sequence associated with the new game mode and then applying the determination indicated at process block 408 for the next record in that sequence. Once a particular game mode target sequence is in an active state, the process shown in FIG. 4 in dashed box 407 continues until the end condition is detected for that game mode or the end condition is detected for the player in the game. In the former case, the process then switches back to the main target sequence for further loops through the series of steps shown in dashed box 407 in FIG. 4. In the latter case, the game proceeds to the termination sequence at block 420 to terminate that instance of the play.

FIGS. 7 through 10 each comprise a representation of a display produced on a suitable display system for a target-interactive game according to aspects of the invention. Each of these representations is of a different point in time during the course of a play in the example target-interactive game. The example game illustrated in FIGS. 7 through 10 displays prize targets in the form of types of fruit (lemon 701, pineapple 702, and watermelon 703) that are introduced into the display area 704 and move across the display area in some fashion. The player may interact with a given target by swiping across the target as it appears in the display area 704, either directly with a finger swipe where the display comprises a touch screen or through a cursor control by the player in some suitable fashion. A swipe across the respective target (701, 702, or 703) is considered a successful player interaction in this embodiment while a swipe that misses a target is considered unsuccessful as to that object. In each of FIGS. 7 through 10, each of the displayed fruit targets is selected in accordance with the process shown in FIG. 4. Each of the fruit targets has a particular prize value for a successful interaction and the prize value is consistent over the course of the play and from one play to the next. For example the watermelon targets 703 shown in FIG. 7 may each be worth 10 credits for a successful player interaction, while the lemon targets 701 may each be worth 5 credits. Each time a player successfully interacts with a single one of the fruit targets on a swipe, the target may be displayed as being cut and splattering, and a balloon may pop up adjacent to the fruit showing the prize value for the successful interaction. As will be described below in connection with FIG. 12, a separate tally may be maintained for of prizes accrued from "Combo" interactions from the player. These Combo interactions are those in which a single swipe crosses multiple fruit prize targets. In the case of such Combo interactions instead of showing individual balloon popups with the awarded prize amounts next to each target as with single prize target interactions, the display system shows a common banner with the total of all prize amounts collected for the Combo swipe. The banner may also show the total number of prize targets affected with the swipe.

Figure 7:
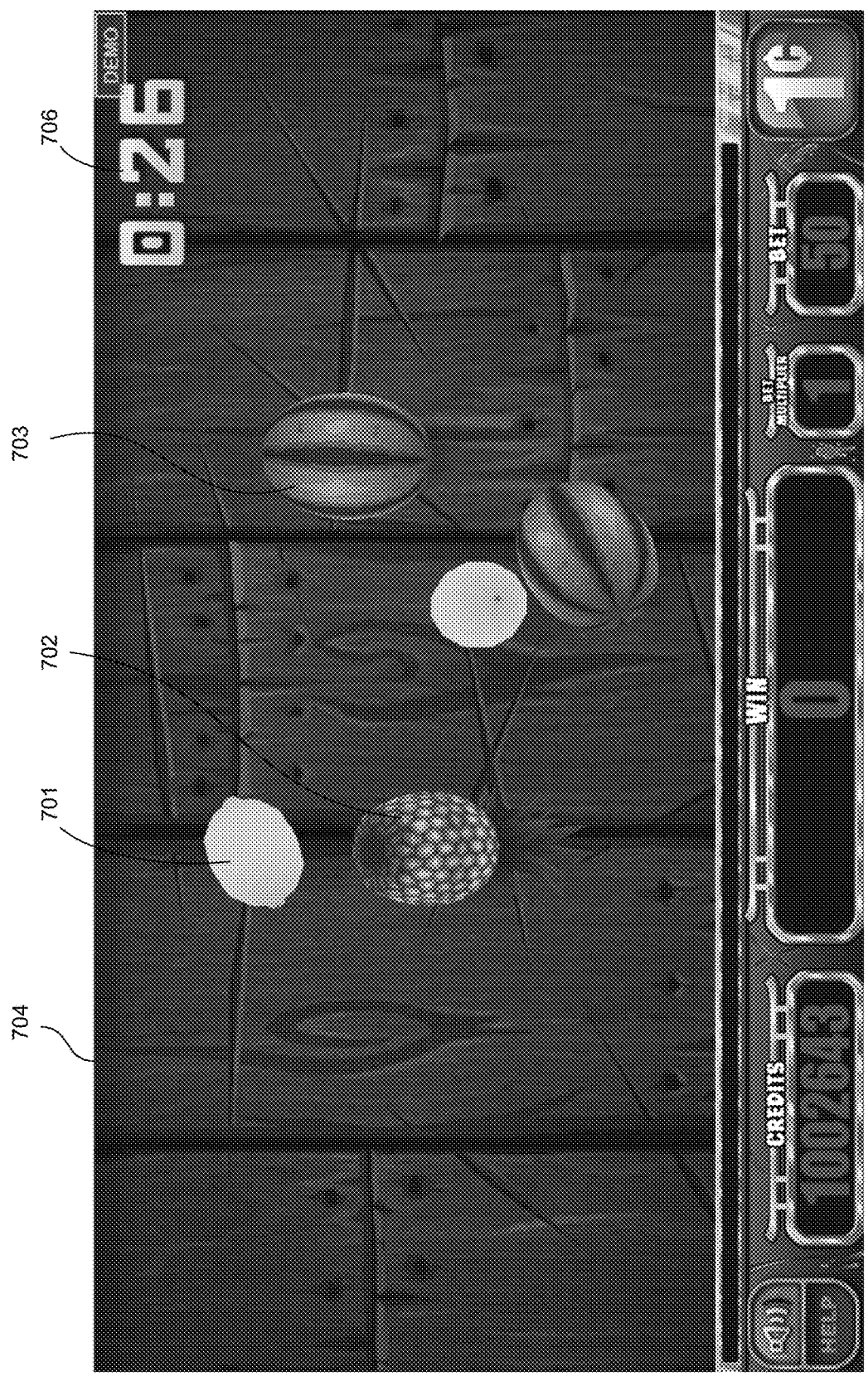
FIG. 7 is a representation of a first point in time of a play in a target-interactive game in accordance with aspects of the present invention.

FIG. 7 provides a representation of a display system at a fairly early point in a play in which no targets have received a successful interaction from the player. In this particular example, the play is limited to 30 seconds and a countdown timer 706 appears in the upper right-hand corner of the display showing the time left in the play. The prize for the play is accumulated in the win meter area 708 shown in the center bottom of the display area 704. FIG. 7 shows a win of zero since no targets have received a successful interaction thus far in the play. The game mode in effect at the time of the representation shown in FIG. 7 may be a main game mode which is in effect at the start of play.

Figure 8:
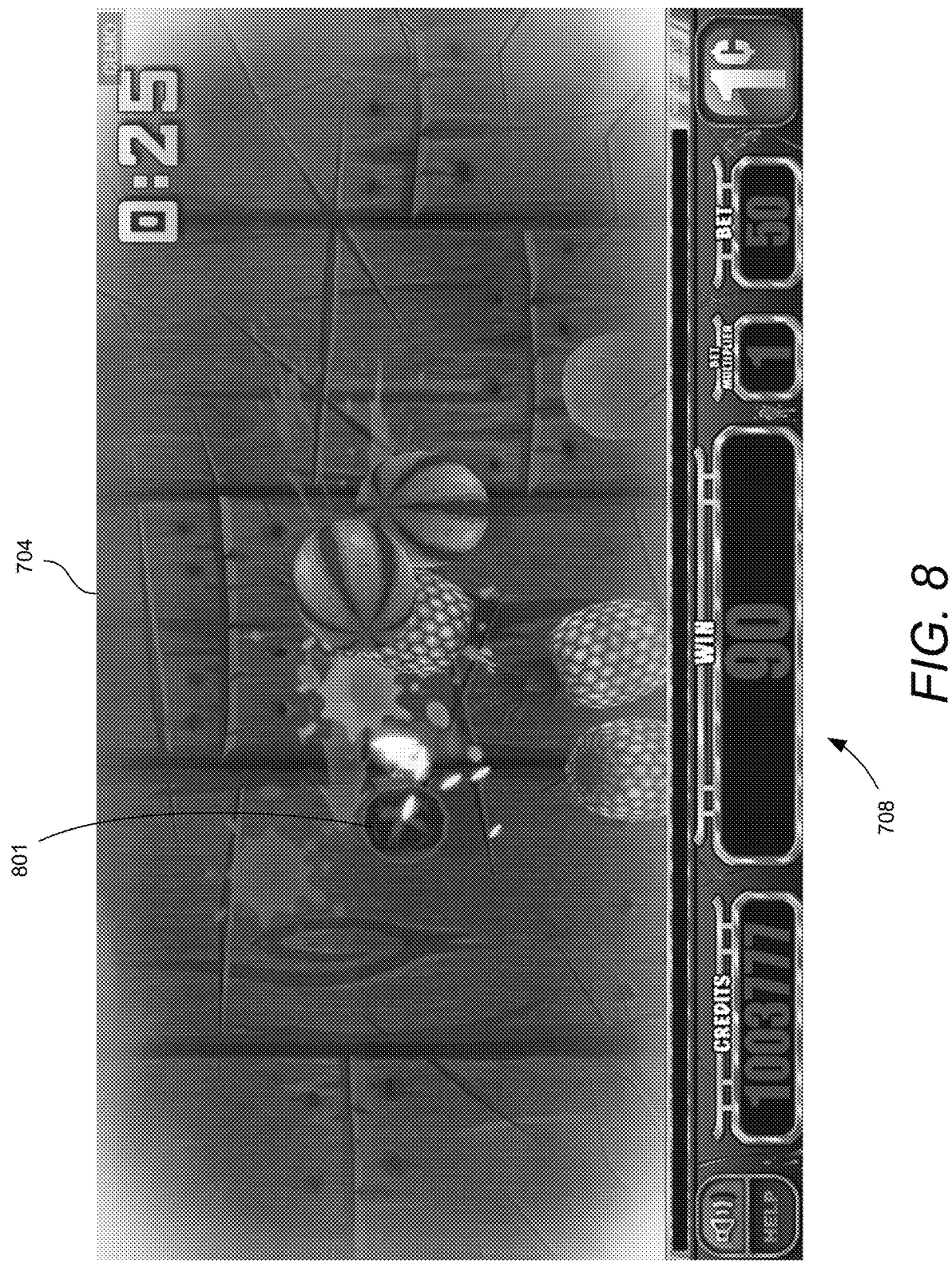
FIG. 8 is a representation of a second point in time of the play the target-interactive game represented in FIG. 7.

FIG. 8 provides a representation from a point in the game in which an additional game mode is active. In this game mode, the display area 704 clouds or frosts over and the countdown timer 706 stops. Targets are still introduced into the display area in accordance with the method shown in FIG. 4, but the rate of movement across the display may be reduced. FIG. 8 shows that the player has made several successful interactions by that point in time with a number of prize targets having a total value of 90 credits as shown in the win meter area. This example of FIG. 8 also shows an additional type of target which may be displayed in target-interactive games within the scope of the present invention. This object is represented as a bomb 801, and an interaction with the bomb target may cause all of the prize targets to be removed from the display. Thus the bomb target is a target that the player perceives should be avoided in the course of play. Of course since the prize for the player in the game is predetermined, whether the player interacts with it or not does not change the total prize which will ultimately be awarded for the play.

Figure 9:
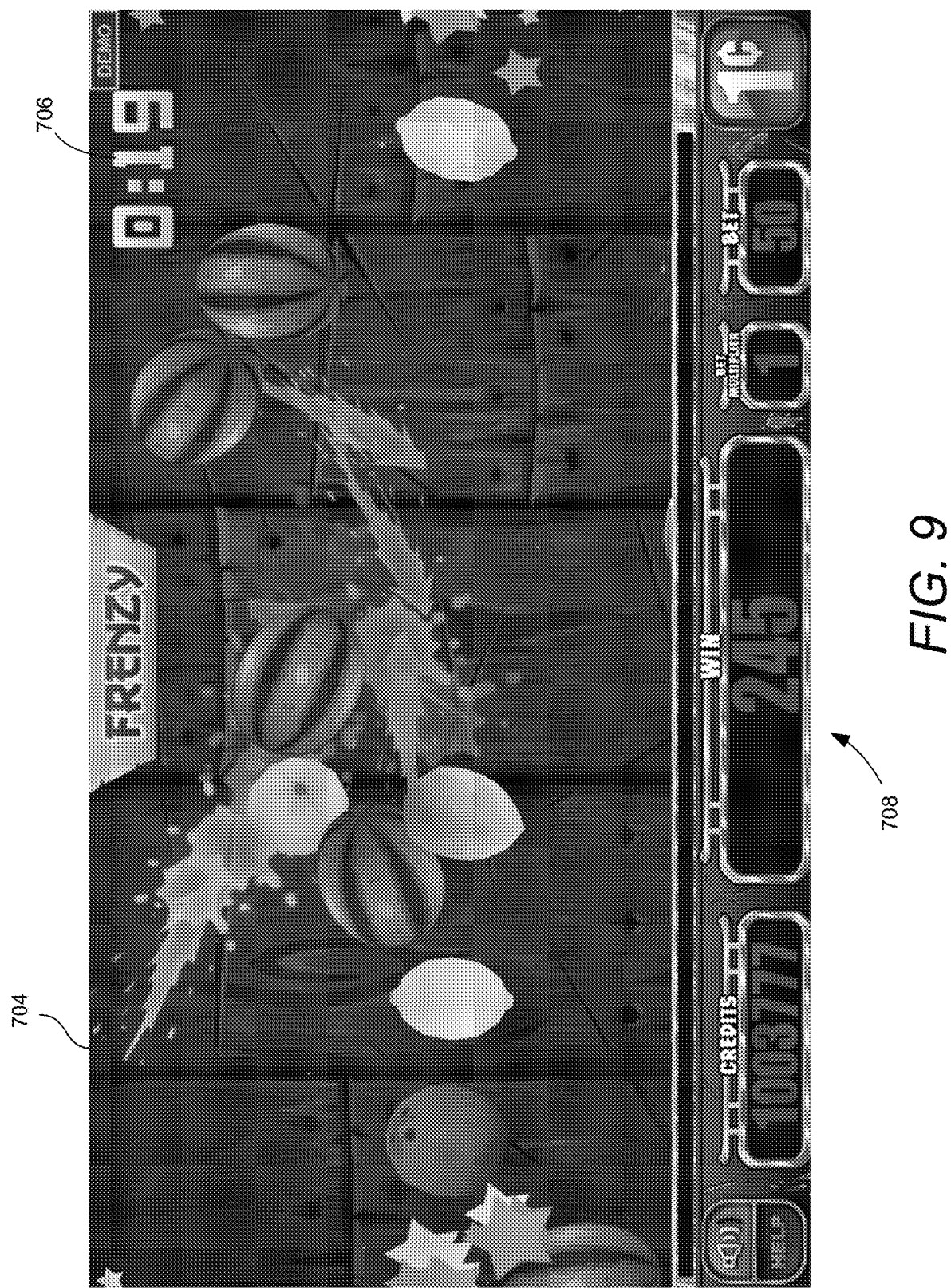
FIG. 9 is a representation of a third point in time of the play in the target-interactive game represented in FIG. 7.

FIG. 9 shows a point in the game in which another additional game mode is active. This additional game mode is indicated by the label "FRENZY" appearing at the top of the display area 704. In this frenzy game mode example, fruit prize targets are introduced on the display area 704 according to the process shown in FIG. 4 at a higher rate than an initial game mode and the fruit prize targets may be shown to move at a higher rate across the display area.

Figure 10:
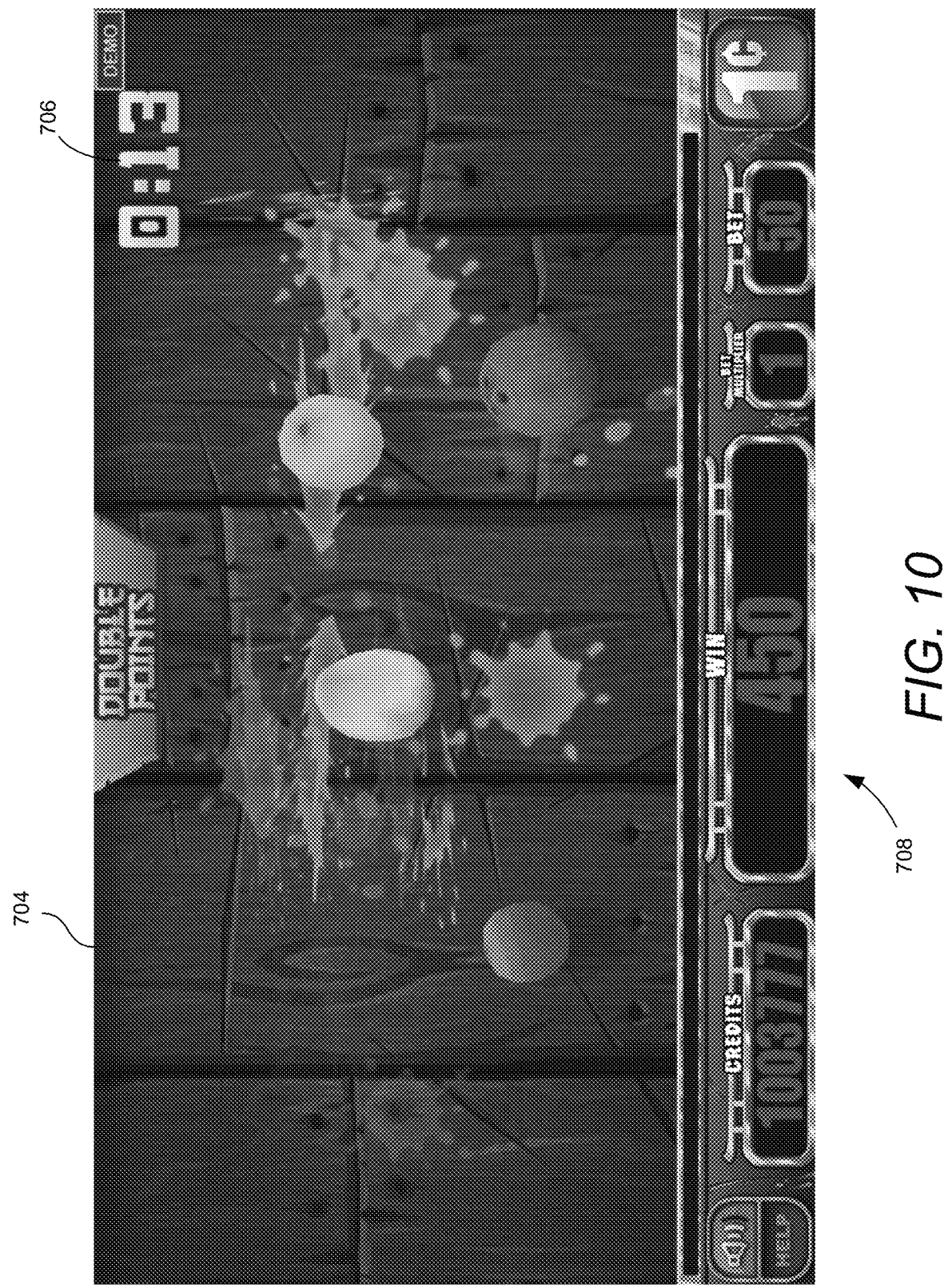
FIG. 10 is a representation of a fourth point in time of the play in the target-interactive game represented in FIG. 7.

FIG. 10 shows a representation of yet another additional game mode which may be active over the course of this example game. This further additional game mode is indicated by the label "DOUBLE POINTS" appearing at the center in the upper part of display area 704. As labels suggests, in this additional game mode each successful interaction with a prize target is shown as awarding double the normal points for the prize target. For example, the lemon target 701 may normally be worth 5 credits but worth 10 credits for a successful interaction in the game mode indicated in FIG. 10.

Figure 11:
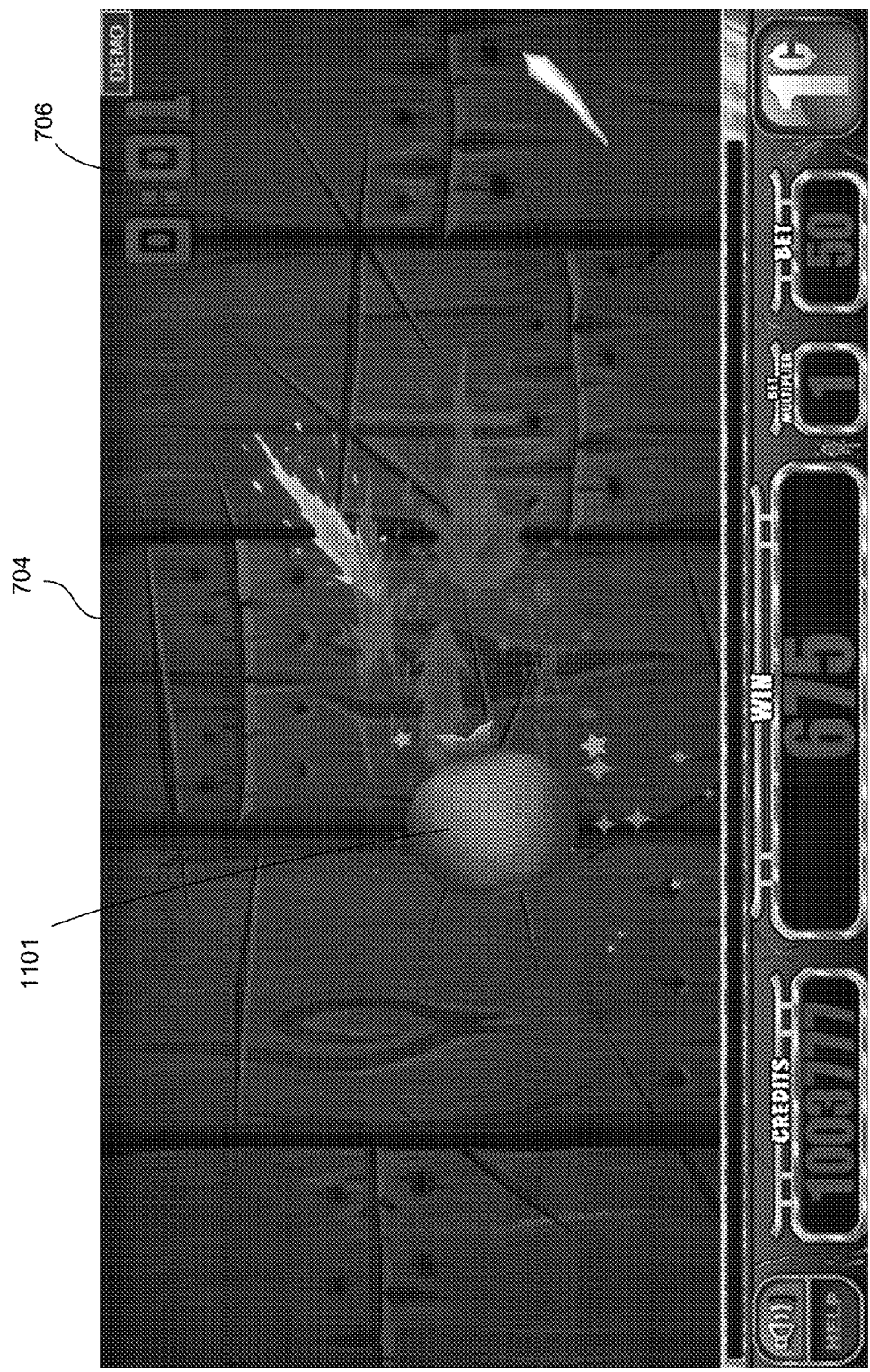
FIG. 11 is a representation of a point in time of at the end of the play in the target-interactive game represented in FIG. 7.
Figure 12:
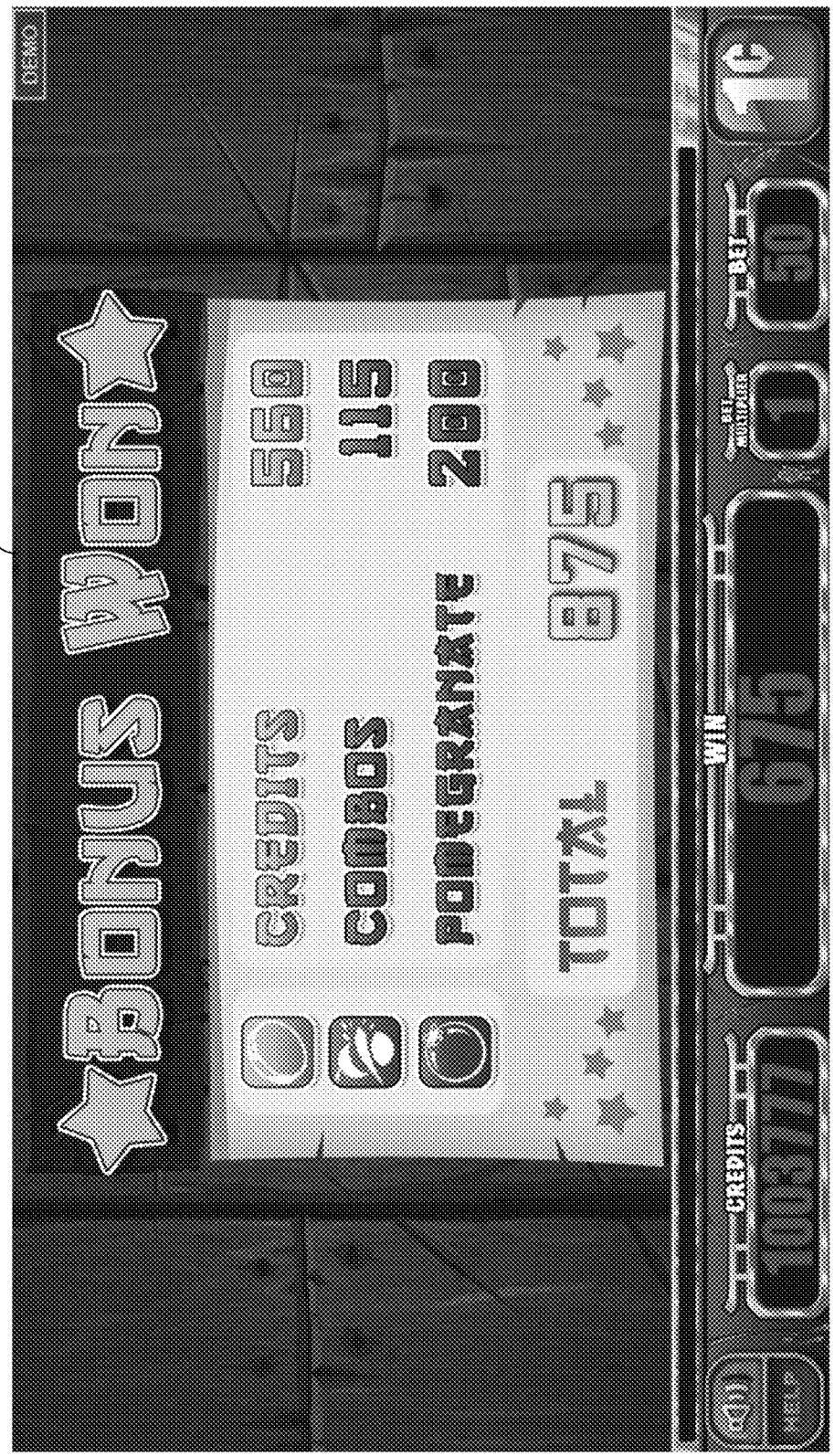
FIG. 12 is a representation of another point in time of at the end of the play in the target-interactive game represented in FIG. 7.

FIGS. 11 and 12 provide representations from an example play ending sequence at the end of play for the target interaction game depicted in FIGS. 7 through 10. As shown in FIG. 11, at the end of the allotted time for the play according to countdown timer 706, all of the prize targets are caused to clear off display area 704 and a single game ending target 1101 enters the display area. This game ending target 1101 is used to award any amount remaining in order to reach the predetermined total prize to be awarded for the play in the game as described above in connection particularly with process block 402 in FIG. 4. In particular the process described in FIG. 4 controls the display of prize targets in display area 704 to guarantee that the total successful player interactions produce at least a minimum differential to the overall prize so that an additional prize may be shown by the game ending target 1101 depicted in FIG. 11. The prize associated with game ending target 1101 shown in FIG. 11 may not require a successful interaction from the player in order for the prize value associated with that target to be displayed and added to the overall prize awarded for the play of the game. FIG. 11 shows the state in the display system while the value associated with game ending target 1101 is not yet displayed and the value accumulated by successful player interactions with the targets is shown in the win meter area 708 as 675 credits. FIG. 12 is a representation of the display which tallies the various components of the total prize awarded for the play, which is 875 credits in this case. The tally shows credits from various successful interactions in the form of regular credits under the label "CREDITS" and credits from Combos under the "COMBOS" label, and also shows the value of the game ending target 1101 to be 200 credits in this example.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A method of controlling targets displayed during a play in a player-interactive game conducted through a gaming machine, the method including:
    (a) at a data processing system associated with the gaming machine, receiving a total prize amount to be awarded for the play of the player-interactive game;
    (b) under control of the data processing system, determining an expected target value for a respective record from a target sequence comprising a sequence of records, wherein a number of adjacent records in the sequence of records are linked by a wave type property;
    (c) under control of the data processing system, selecting a target value for the respective record from a number of different available target values, the selected target value comprising a value from among the number of different available target values that (i) bears a predefined relationship to the expected target value, and, (ii) where the respective record is linked by the wave type property, is consistent with the wave type property;
    (d) under control of the data processing system, selecting a target type correlated to the selected target value;
    (e) causing a prize target corresponding to the selected target type to be displayed on a display system of the gaming machine under control of the data processing system; and
    (f) repeating steps (b), (c), (d), and (e) for each respective record in the target sequence until an end condition is detected for the play of the player-interactive game.

2. The method of claim 1 further including:
    (a) generating the target sequence under control of the data processing system, each record of the target sequence correlating to an unspecified respective target to be displayed in the play of the player-interactive game and specifying a delay from a time that a previous target is displayed on the display system;
    (b) for a game mode modifier specified for the play of the player-interactive game, generating an additional target sequence under control of the data processing system, the additional target sequence comprising a sequence of records for an additional mode of the play of the player-interactive game, wherein a number of adjacent records in the sequence of records for the additional mode of play in the player-interactive game are linked by an additional mode wave type property;
    (c) when the play of the player-interactive game is in a game mode corresponding to the additional target sequence, determining, under control of the data processing system, an expected target value for a respective record of the additional target sequence;
    (d) under control of the data processing system, selecting an additional target value for the respective record of the additional target sequence from the number of different available target values, the selected additional target value comprising a value from among the number of different available target values that (i) bears the predefined relationship or another predefined relationship to the expected target value determined for the respective record of the additional target sequence, and, (ii) where the respective record of the additional target sequence is linked by the additional mode wave type property, is consistent with the additional mode wave type property;

(e) under control of the data processing system selecting an additional target type correlated to the selected additional target value;

(f) causing a prize target corresponding to the selected additional target type to be displayed on the display system under control of the data processing system; and (g) repeating steps (c), (d), (e), and (f) of this claim for each respective record in the additional target sequence until an end condition is detected for the game mode corresponding to the additional target sequence.

3. The method of claim 2 further including under control of the data processing system selecting a prize distribution between the game mode corresponding to the additional target sequence and a game mode corresponding to the target sequence.

4. The method of claim 1 wherein determining the expected target value includes determining an available prize value, the available prize value comprising an amount by which the total prize amount to be awarded exceeds a combined value of all prize targets having previously received a respective successful interaction from a player in the play in the player-interactive game and the value of all prize targets currently displayed on the display system.

5. The method of claim 4 wherein determining the expected target value includes determining a remaining target count, the remaining target count comprising at least an estimate of the remaining prize targets to be displayed in the play in the player-interactive game.

6. The method of claim 1 wherein the predefined relationship to the expected target value comprises the minimum differential to the expected target value.

7. The method of claim 1 wherein the predefined relationship to the expected target value comprises a randomly selected value within a predefined distribution about the expected target value.

8. The method of claim 1 wherein the wave type property specifies a target type constraint which defines a relationship between each respective record linked by the wave type property.

9. A gaming machine providing a player-interactive game, the gaming machine including:
  (a) a display system;
  (b) a player input system;
  (c) at least one processor; and
  (d) at least one memory device storing instructions executable by the at least one processor to:
    (i) receive a total prize amount to be awarded for a play of the player-interactive game,
    (ii) determine an expected target value for a respective record from a target sequence comprising a sequence of records, wherein a number of adjacent records in the sequence of records are linked by a wave type property,
    (iii) select a target value for the respective record from a number of different available target values, the selected target value comprising a value from among the number of different available target values that bears a predefined relationship to the expected target value, and, where the respective record is linked by the wave type property, is consistent with the wave type property,
    (iv) select a target type correlated to the selected target value,
    (v) cause a prize target corresponding to the selected target type to be displayed on the display system, and
    (vi) repeat (ii), (iii), (iv), and (v) for each respective record in the target sequence until an end condition is detected for the play of the player-interactive game.

10. The gaming machine of claim 9 wherein the instructions are further executable by the at least one processor to:
  (a) generate the target sequence, each record of the target sequence correlating to an unspecified respective target to be displayed in the play of the player-interactive game and specifying a delay from a time that a previous target is displayed on the display system;
  (b) for a game mode modifier specified for the play of the player-interactive game, generate an additional target sequence comprising a sequence of records for an additional mode of the play of the player-interactive game;
  (c) when the play of the player-interactive game is in a game mode corresponding to the additional target sequence, determine an expected target value for a respective record of the additional target sequence;
  (d) select an additional target value for the respective record of the additional target sequence from the number of different available target values, the selected additional target value comprising a value from among the number of different available target values that bears the predefined relationship or another predefined relationship to the expected target value determined for the respective record of the additional target sequence;
  (e) select an additional target type correlated to the selected additional target value;
  (f) cause a prize target corresponding to the selected additional target type to be displayed on the display system; and
  (g) repeat steps (c), (d), (e), and (f) of this claim for each respective record in the additional target sequence until an end condition is detected for the game mode corresponding to the additional target sequence.

11. The gaming machine of claim 10 wherein the instructions are further executable by the at least one processor to select a prize distribution between the game mode corresponding to the additional target sequence and a game mode corresponding to the target sequence.

12. The gaming machine of claim 9 wherein determining the expected target value includes determining an available prize value, the available prize value comprising an amount by which the total prize amount to be awarded exceeds a combined value of all prize targets having previously received a respective successful interaction from a player in the play of the player-interactive game and the value of all prize targets currently displayed on the display system.

13. The gaming machine of claim 12 wherein determining the expected target value includes determining a remaining target count, the remaining target count comprising at least an estimate of the remaining prize targets to be displayed in the play of the player-interactive game.

14. The gaming machine of claim 9 wherein the predefined relationship to the expected target value comprises the minimum differential to the expected target value.

15. The gaming machine of claim 9 wherein the predefined relationship to the expected target value comprises a randomly selected value within a predefined distribution about the expected target value.

16. The gaming machine of claim 9 wherein the wave type property specifies a target type constraint which defines a relationship between each respective record linked by the wave type property.

17. A program product comprising one or more non-transitory computer readable data storage devices storing program code for a player-interactive game conducted through a gaming machine including a display system, the program code including:
   (a) player input program code executable by at least one processor to, responsive to each successful interaction input received in a play of the player-interactive game for a respective target, add a predetermined value associated with the respective target to a prize accumulator;
   (b) expected target value program code executable by the at least one processor to determine an expected target value for a respective record from a target sequence comprising a sequence of records, wherein a number of adjacent records in the sequence of records are linked by a wave type property;
   (c) target launching program code executable by the at least on processor to:
      (i) select a target value for the respective record from a number of different available target values, the selected target value comprising a value from among the number of different available target values that bears a predefined relationship to the expected target value, and, where the respective record is linked by the wave type property, is consistent with the wave type property;
      (ii) select a target type correlated to the selected target value;
      (iii) cause a prize target corresponding to the selected target type to be displayed on the display system; and
      (iv) repeat (b) and (c) of this claim for each respective record in the target sequence until an end condition is detected for the play of the player-interactive game.

18. The program product of claim 17 further including sequence generating program code executable to generate the target sequence, each record of the target sequence correlating to an unspecified respective target to be displayed in the play of the player-interactive game and specifying a delay from a time that a previous target is displayed on the display system.

19. The program product of claim 18 wherein the sequence generating program code is also executable to:
   (a) generate the target sequence, each record of the target sequence correlating to an unspecified respective target to be displayed in the play of the player-interactive game and specifying a delay from a time that a previous target is displayed on the display system.
   (b) generate an additional target sequence for a game mode modifier specified for the play of the player-interactive game, the additional target sequence comprising a sequence of records for an additional mode of play of the game.

20. The program product of claim 19 wherein:
   (a) the expected target value program code is also executable, when the play of the player-interactive game is in a game mode corresponding to the additional target sequence, determine an expected target value for a respective record of the additional target sequence; and
   (b) the target launching program code is also executable to:
      (i) select an additional target value for the respective record of the additional target sequence from the number of different available target values, the selected additional target value comprising a value from among the number of different available target values that bears the predefined relationship or another predefined relationship to the expected target value determined for the respective record of the additional target sequence;
      (ii) select an additional target type correlated to the selected additional target value;
      (iii) cause a prize target corresponding to the selected additional target type to be displayed on the display system; and
      (iv) repeat steps (a) and (b) of this claim for each respective record in the additional target sequence until an end condition is detected for the game mode corresponding to the additional target sequence.

* * * * *